United States Patent
Elliott

(10) Patent No.: US 7,222,700 B2
(45) Date of Patent: May 29, 2007

(54) ROLLER DISK BRAKE FOR A WINCH

(75) Inventor: Ronald L Elliott, Oregon City, OR (US)

(73) Assignee: Warn Industries, Inc., Milwaukie, OR (US)

( * ) Notice: Subject to any disclaimer, the term of this patent is extended or adjusted under 35 U.S.C. 154(b) by 21 days.

(21) Appl. No.: 10/829,756

(22) Filed: Apr. 22, 2004

(65) Prior Publication Data

US 2005/0236238 A1    Oct. 27, 2005

(51) Int. Cl.
*B60T 1/00* (2006.01)
*B60T 13/00* (2006.01)

(52) U.S. Cl. .................. 188/30; 188/166; 254/375

(58) Field of Classification Search ........... 254/375, 254/378; 188/166, 30, 82.1, 82.3
See application file for complete search history.

(56) References Cited

U.S. PATENT DOCUMENTS

| | | | |
|---|---|---|---|
| 292,828 A | | 2/1884 | Lawlor |
| 320,222 A | | 6/1885 | Weimer |
| 710,757 A | * | 10/1902 | Coleman et al. ........... 188/82.9 |
| 1,285,663 A | | 11/1918 | Fouse |
| 1,911,461 A | | 5/1933 | Musselman |
| 2,175,383 A | * | 10/1939 | Eason ........................ 192/18 R |
| 2,423,070 A | | 6/1947 | Sayles |
| 2,783,861 A | * | 3/1957 | Jungles ........................ 188/134 |
| 2,827,136 A | * | 3/1958 | Sorchy ........................ 188/166 |
| 2,834,443 A | * | 5/1958 | Olchawa ................... 192/223.3 |
| 2,891,767 A | | 6/1959 | Armington, Jr. |
| 2,925,157 A | * | 2/1960 | Davis ....................... 192/223.3 |
| 3,071,349 A | | 1/1963 | Glaze |
| 3,107,899 A | | 10/1963 | Henneman |
| 3,319,492 A | | 5/1967 | Magnuson |
| 3,382,953 A | | 5/1968 | Wilkinson |
| 3,519,247 A | * | 7/1970 | Christison .................... 254/344 |
| 3,536,169 A | | 10/1970 | Arnold |
| 3,627,087 A | | 12/1971 | Eskridge |
| 3,834,670 A | | 9/1974 | Pityo |
| 3,994,376 A | | 11/1976 | Fulghum |
| 4,004,780 A | | 1/1977 | Kuzarov |
| 4,103,872 A | | 8/1978 | Hirasuka |

(Continued)

FOREIGN PATENT DOCUMENTS

GB        948592        8/1962

OTHER PUBLICATIONS

Robert L. Norton Machine Design: An inetgrated approach,Prentice-Hall 1996 pp. 678-680.*

*Primary Examiner*—Robert A. Siconolfi
(74) *Attorney, Agent, or Firm*—Harness, Dickey & Pierce, P.L.C.

(57) ABSTRACT

A brake mechanism having a motor output shaft outputting a driving torque in a power-in and a power-out direction. A camming device operably couples the output shaft to a drive shaft for fixed rotation. A one-way clutch operably couples the drive shaft and a brake device. The brake device is normally in an engaged position that prevents rotation of the clutch device. During a holding maneuver, the one-way clutch, camming device, and brake device cooperate to prevent uncommanded movement. However, the nature of the one-way clutch permits free rotation during a power-in direction and the nature of the camming device permits free rotation during a power-out direction.

25 Claims, 4 Drawing Sheets

U.S. PATENT DOCUMENTS

| | | |
|---|---|---|
| 4,103,873 A | 8/1978 | Sato et al. |
| 4,118,013 A * | 10/1978 | Christison et al. ........... 254/344 |
| 4,185,520 A | 1/1980 | Henneman et al. |
| 4,227,680 A * | 10/1980 | Hrescak ..................... 254/344 |
| 4,344,587 A | 8/1982 | Hildreth |
| 4,408,746 A * | 10/1983 | Marsch et al. ............... 254/344 |
| 4,461,460 A * | 7/1984 | Telford ...................... 254/344 |
| 4,545,567 A * | 10/1985 | Telford et al. ............... 254/344 |
| 4,565,352 A | 1/1986 | Hasselman et al. |
| 4,579,201 A | 4/1986 | Tiedeman |
| 4,601,370 A | 7/1986 | Papadopoulos |
| 4,898,265 A * | 2/1990 | Metcalf ...................... 188/134 |
| 5,002,259 A * | 3/1991 | Manning et al. ............. 254/350 |
| 5,261,646 A * | 11/1993 | Telford ...................... 254/375 |
| 5,398,923 A * | 3/1995 | Perry et al. ................. 254/375 |
| 5,482,255 A * | 1/1996 | Daschel et al. ............. 254/378 |
| RE36,216 E * | 6/1999 | Telford ...................... 254/375 |
| 6,604,731 B2 | 8/2003 | Hodge |

* cited by examiner

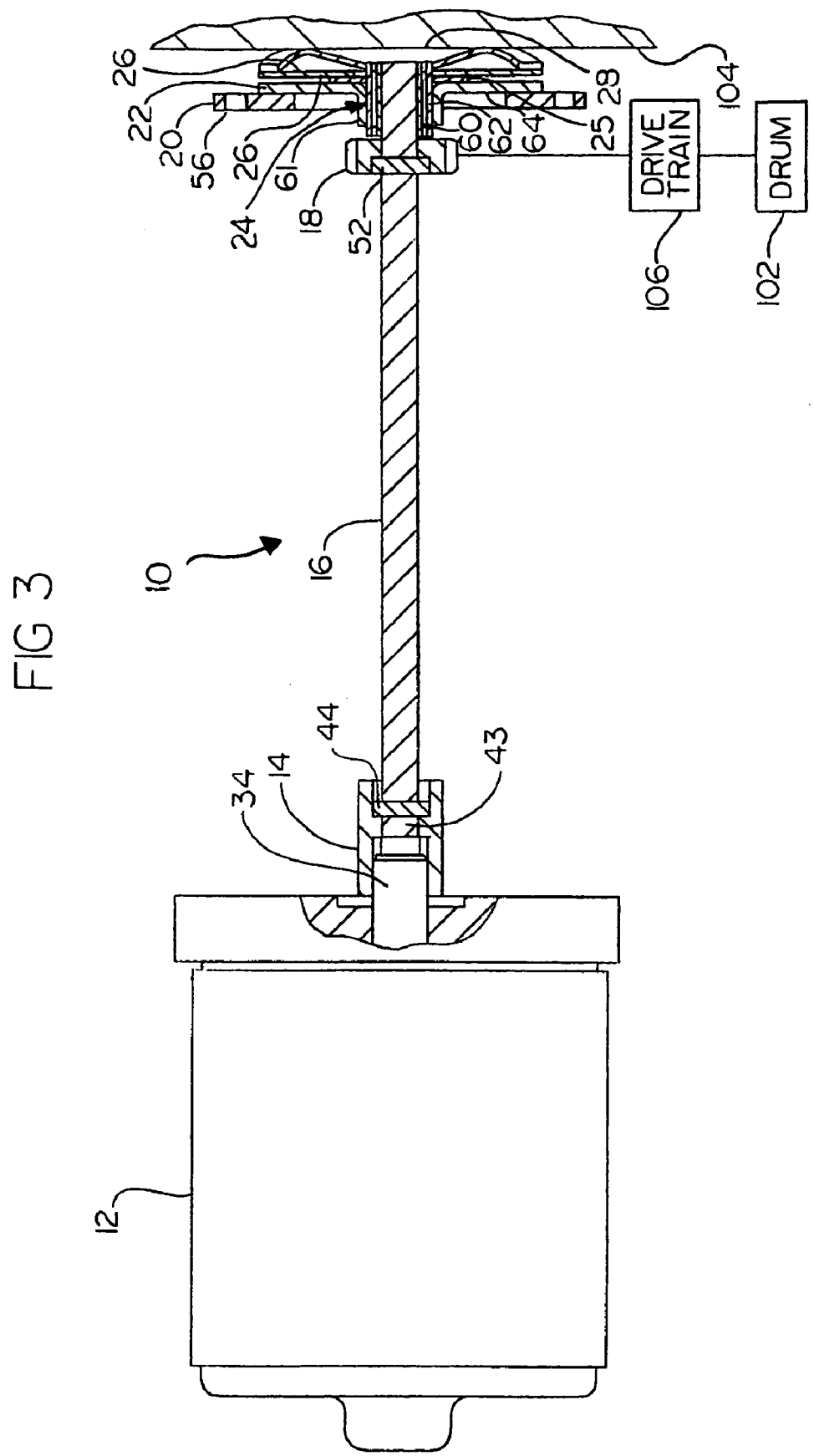

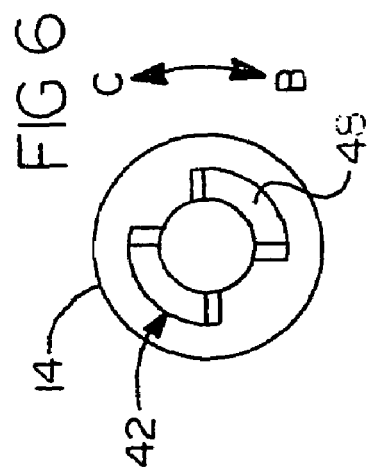
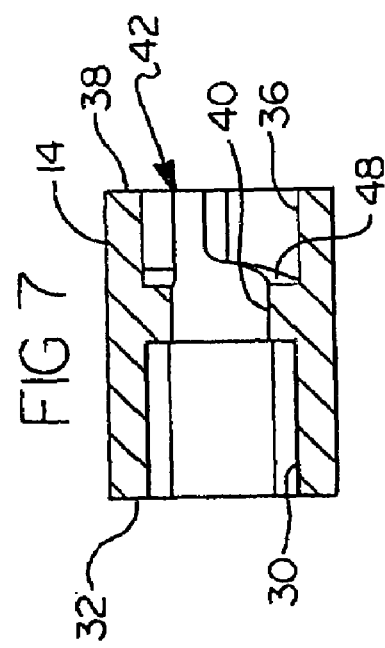
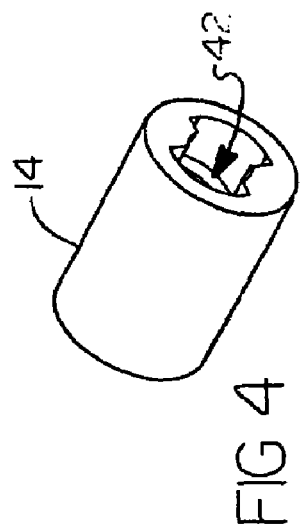
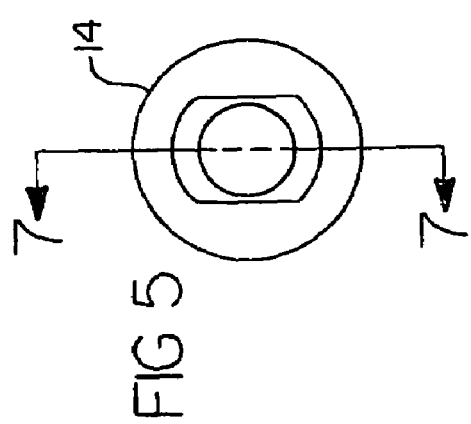

ROLLER DISK BRAKE FOR A WINCH

FIELD OF THE INVENTION

The present invention relates to brake mechanisms and, more particularly, relates to a brake mechanism for use with a winch, hoist, or other device requiring resistance to driven torque.

BACKGROUND OF THE INVENTION

As is common practice, winches, hoists, and other power devices requiring resistance to driven torque often employ brake mechanisms to satisfy various design criteria. Winches, hoists, and the like typically employ a motor that drives a gear train, which is coupled to a drum. The motor is often capable of being driven in opposite rotary directions, which is commonly referred to as "power-in" and "power-out" directions. When the motor is not actuated (i.e. idle), it is typically preferable that the drum is stationary thereby opposing any external loads or driven torque.

The brake mechanisms of these devices often utilize a series of brake or friction plates that provide an opposing force when engaged that minimizes or prevents movement of the drum in response to any external driven torque. In essence, these brake mechanisms lock the power device to permit "holding" while under load.

However, traditional brake mechanisms suffer from a number of disadvantages. For example, traditional brake mechanisms are incapable of eliminating drag associated with the brake mechanism when the device is being driven in the power-in direction. Similarly, traditional brake mechanisms often suffer from excessive drag that inhibits efficient operation when the device is being driven in the power-out direction. Still further, traditional brake mechanisms are often incapable of distinguishing between drive torque and driven torque and, thus, may lead to excessive drag on the device or insufficient holding capacity.

Accordingly, there exists a need in the relevant art to provide a brake mechanism for use with a winch, hoist, or similar power device that is capable of eliminating drag associated with a power-in drive motion. Similarly, there exists a need in the relevant art to provide a brake mechanism for use with a winch, hoist, or similar power device that is capable of minimizing drag associated with a power-out drive motion. Still further, there exists a need in the relevant art to provide a brake mechanism for use with a winch, hoist, or similar power device that is capable of overcoming the limitations of the prior art.

SUMMARY OF THE INVENTION

According to the principles of the present invention, a brake mechanism is provided having an advantageous construction. The brake mechanism includes a motor output shaft outputting a driving torque in a first and a second rotary direction. A camming device operably couples the output shaft to a drive shaft for fixed rotation. A roller clutch operably couples the drive shaft and a brake device. The brake device is normally in an engaged position that prevents rotation of the brake device. The roller clutch permits the drive shaft to spin freely relative to the brake device when the output shaft of the motor is driven in the first rotary direction, yet locks the drive shaft and brake device together when the output shaft of the motor is driven in the second rotary direction. Therefore, when the motor output shaft is driven in the first rotary direction, the brake device remains biased into the engaged position, yet the roller clutch permits free rotation of the drive shaft relative to the brake device. When the motor output shaft is driven in the second rotary direction, the roller clutch locks the drive shaft and the brake device together, yet the camming device shifts the drive shaft which disengages the brake device and permits free rotation of the drive shaft and brake device together. When the motor output shaft is idle, the camming device and roller clutch prevent uncommanded movement of the drive shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a cross-sectional view illustrating the roller disk brake system;

FIG. 4 is a perspective view illustrating a cam coupler of the present invention;

FIG. 5 is a left side view illustrating the cam coupler;

FIG. 6 is a right side view of the cam coupler; and

FIG. 7 is a cross-sectional view illustrating the cam coupler taken along Line 7-7 of FIG. 5.

DETAILED DESCRIPTION OF THE PREFERRED EMBODIMENT

The following description of the preferred embodiment is merely exemplary in nature and is in no way intended to limit the invention, its application, or uses. For example, the present invention may find utility in a wide variety of applications, such as winches, hoists, or similar device.

Referring now to the figures, there is illustrated a roller disk brake system, generally indicated at 10, for use with a winch, hoist, or other power device requiring resistance to driven torque. In the interest of brevity, the present disclosure will not discuss in detail the overall construction of the associated winch, hoist, or other power device.

Figure 1:
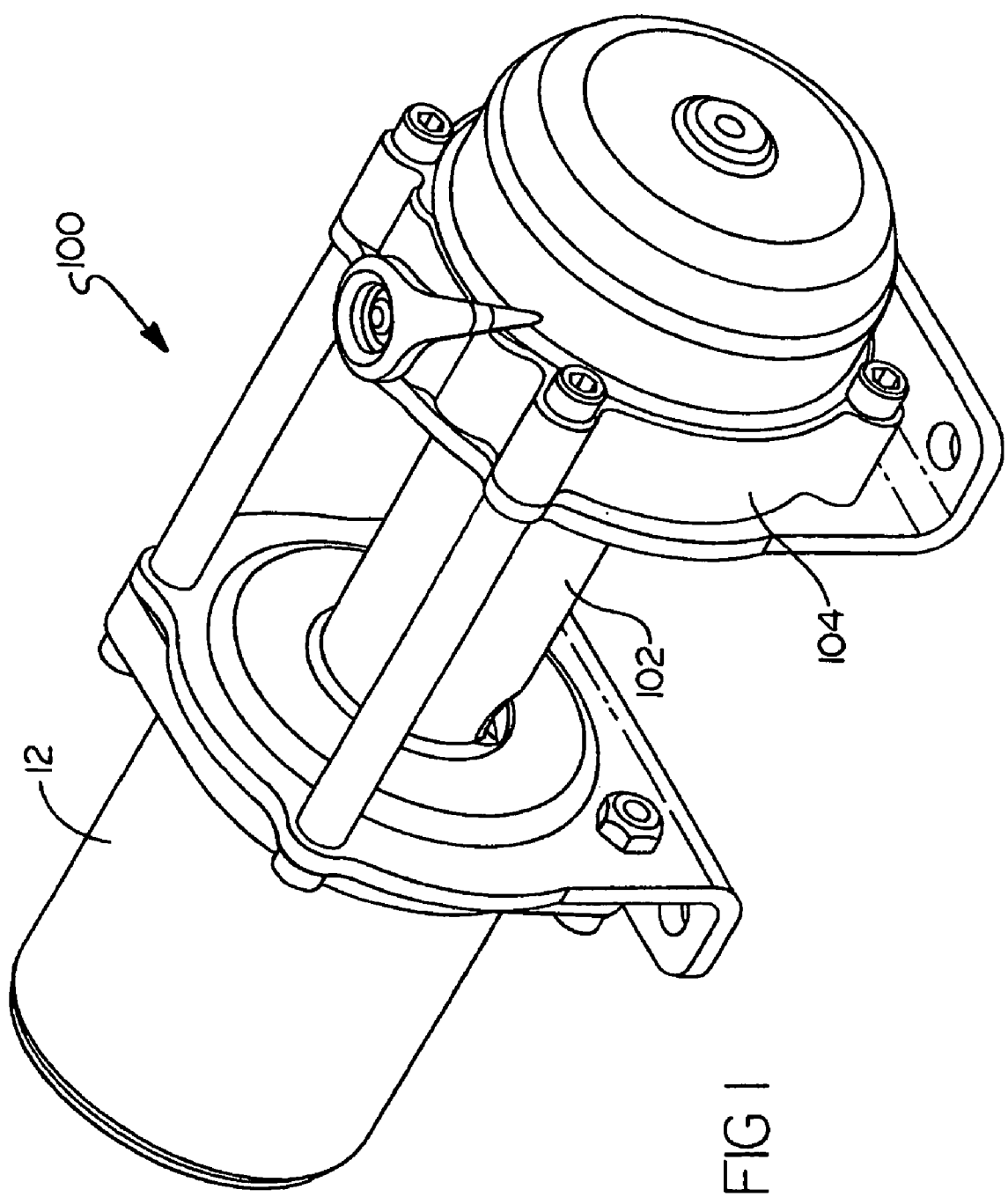
FIG. 1 is a perspective view illustrating an exemplary winch employing a roller disk brake system according to the principles of the present invention.
Figure 2:
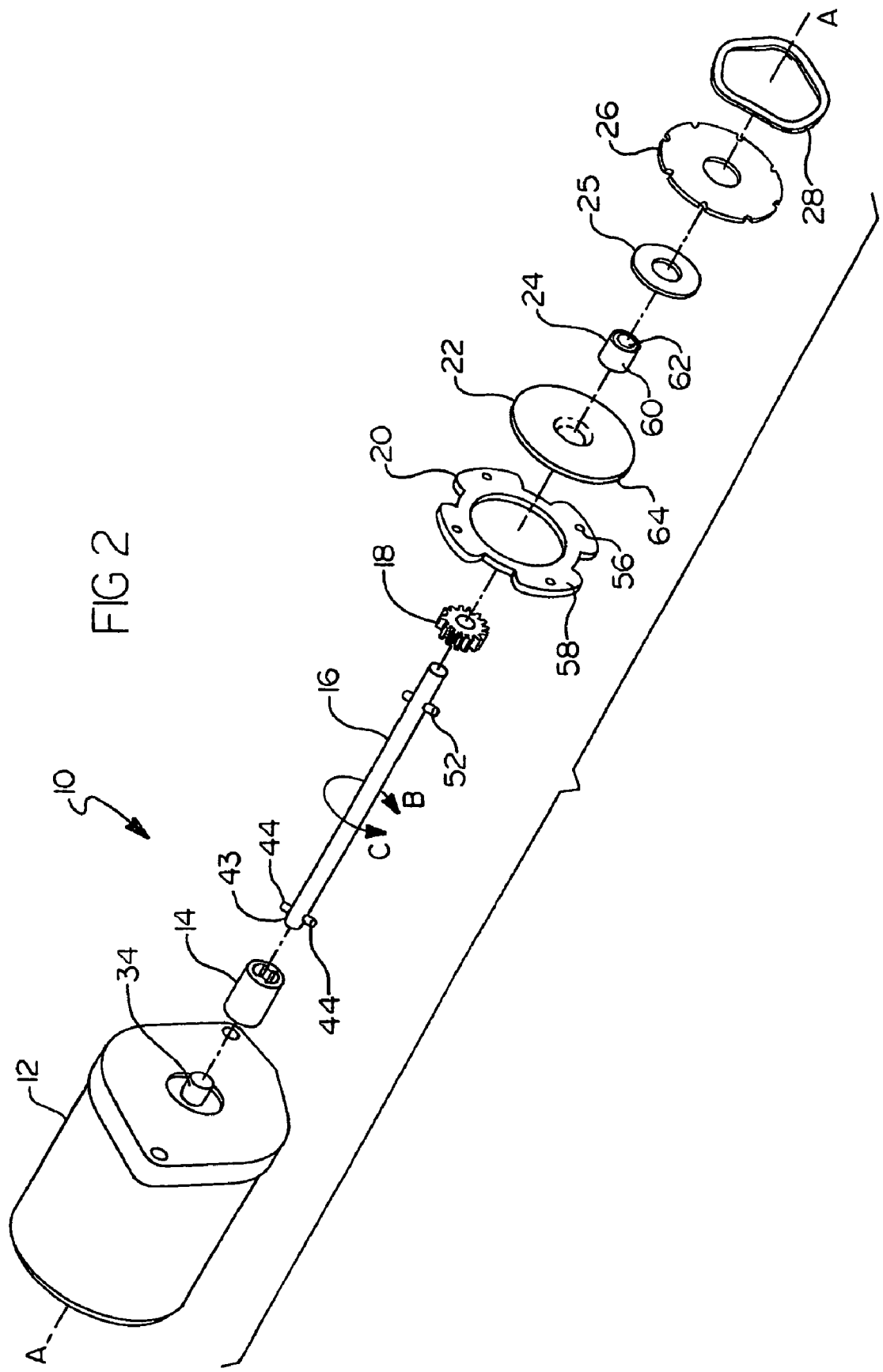
FIG. 2 is an exploded perspective view illustrating the roller disk brake system according to the principles of the present invention.

However, briefly by way of background, an exemplary winch 100 for use with the present invention is illustrated in FIG. 1. Winch 100 preferably includes a rotatable hollow cylindrical drum 102 for winding and unwinding a length of wire rope or cable (not shown). Drum 102 may be positively driven in either direction by a reversing motor 12 (FIG. 2). In other words, drum 102 may be positively driven in a "power-in" direction, thereby retracting the wire rope or cable, and a "power-out" direction, thereby extending the wire rope or cable.

Motor 12 is generally a reversible electric motor, thereby receiving its power-input from a battery. However, it should be understood that other types of motors, such as hydraulic, may be used in connection with the present invention to provide the necessary motive force. Motor 12 is coupled to a drum 102 through a speed reducing gear train 106 (FIGS.

2 and 3) contained within a housing 104 (FIG. 1). Gear train 106 reduces the rotational speed of drum 102 with respect to the motor output shaft (and thus provides torque amplification) in a manner such as disclosed in commonly assigned U.S. Pat. No. 4,545,567. Roller disk brake system 10 is preferably provided in the interior cavity of drum 102 and housing 104, so as to protect roller disk brake system 10 from damage and/or environmental exposure.

Referring to FIGS. 2-7, roller disk brake system 10 includes a cam coupler 14, a drive shaft 16, a sun gear 18, a stationary plate 20, a brake disk 22, a roller clutch 24, a shim washer 25, a thrust washer 26, and a spring 28.

As best seen in FIGS. 4-7, cam coupler 14 is preferably cylindrical in shape. Cam coupler 14 includes a first bore 30 formed in a first end 32 thereof. First bore 30 is sized and shaped to operably receive an output shaft 34 extending from motor 12 (FIG. 2). Accordingly, cam coupler 14 is operably coupled to motor output shaft 34 and driven in response to motor 12.

Still referring to FIGS. 4-7, cam coupler 14 includes a second bore 36 formed in a second end 38 thereof. More particularly, second bore 36 includes a central portion 40 and a cam 42. Central portion 40 extends through cam coupler 14 and is sized to receive an end 43 of drive shaft 16 therein (see FIG. 3). As can be seen in FIGS. 2 and 3, drive shaft 16 includes at least one cam follower 44, disposed orthogonal to a longitudinal axis A-A of drive shaft 16. Cam follower 44 is operable to cammingly engage cam 42 to cause axial movement of drive shaft 16 along axis A-A. To this end, cam 42 of cam coupler 14 includes an inclined portion 48 extending from an interior level toward second end 38. The operation of cam coupler 14 will be discussed in detail below.

Referring again to FIGS. 2 and 3, drive shaft 16 includes a drive pin 52 for engaging sun gear 18. Drive pin 52 cooperates with a slot 54 formed in sun gear 18, thereby coupling sun gear 18 with drive shaft 16 for rotation therewith. However, it should be appreciated that sun gear 18 may be fixed for rotation with drive shaft 16 through any one of a number of conventional connections, such as a key and slot connection, spline connection, etc. Sun gear 18 enmeshingly engages additional gears (not shown) of gear train 106 extending between drive shaft 16 and drum 102, as is known in the art. It should be understood that gear train 106 may have any one of a number of different configurations to achieve a desired gear ratio and, thus, is merely schematically illustrated in FIG. 3.

Still referring to FIGS. 2 and 3, stationary plate 20 is generally planar in construction and includes a plurality of mounting apertures 56 and a friction surface 58. The plurality of mounting apertures 56 are sized to receive a fastener therein to fixedly couple stationary plate 20 to housing 104 to prevent rotation of stationary plate 20. Although the preferred method discloses fasteners for preventing rotation of the stationary plate 20, other methods of preventing the rotation of the plate 20 can be utilized.

Brake disk 22 includes a friction surface 64 disposed adjacent friction surface 58 of stationary plate 20. Friction surface 64 of brake disk 22 is operably engagable with friction surface 58 of stationary plate 20 to prevent selectively relative rotation between stationary plate 20 and brake disk 22, thus providing a braking function. Brake disk 22 is biased in an engaged position with stationary plate 20 via spring 28. Specifically, spring 28 acts upon housing 104, thereby outputting a biasing force against thrust washer 26, shim washer 25, and brake disk 22 and engaging brake disk 22 with stationary plate 20. Generally, stationary plate 20 and brake disk 22 serve to define a clutching device 21. The shim washer 25 serves as a bearing device reducing the friction on the back side of the brake disk 22. A roller bearing, thrust bearing, or other low friction device can be used in place of the shim washer 25, as space permits.

Roller clutch 24 is disposed between brake disk 22 and an end of drive shaft 16. Roller clutch 24 is operable to permit free relative rotation between brake disk 22 and drive shaft 16 when motor 12 is operated in a power-in direction. Conversely, roller clutch 24 is operable to lock, thereby preventing relative rotation between brake disk 22 and drive shaft, when motor 12 is operated in a power-out direction. Cam coupler 14 moves brake disk 22 away from stationary plate 20 allowing system rotation. However, roller clutch 24 remains locked in response to a driven torque from an external load.

Specifically, one-way roller clutch 24 includes an outer sleeve 60 fixedly coupled to a hub 61 of brake disk 22 to prevent relative rotation and axial movement of brake disk 22 relative to outer sleeve 60. Roller clutch 24 further includes an inner sleeve 62 similarly fixedly coupled to drive shaft 16 to prevent relative rotation and axial movement of drive shaft 16 relative to inner sleeve 62. A plurality of rollers are disposed between the inner and outer sleeves 62, 60 to prevent relative rotation therebetween in one direction and to relative rotation therebetween in a second direction. Although a roller clutch is shown, other clutch mechanisms can be used.

OPERATION

The present invention operates primarily in three scenarios—a first scenario occurs when a drive torque is required to retract the wire rope (i.e. power-in mode), a second scenario is when a drive torque in the opposite direction is used to extend the wire rope (i.e. power-out mode), and a third scenario occurs when a driven torque is prevented from extending the wire rope (i.e. holding mode).

In the first scenario where a drive torque is required to retract the wire rope, motor 12 is actuated to drive output shaft 34 in direction B (FIG. 2). Output shaft 34 is coupled with cam coupler 14 thereby driving cam coupler 14 in direction B. As a result of the shape of cam 42 and the direction of rotation of cam coupler 14, cam follower 44 remains at a lowermost position along cam 42 within bore 36. Consequently, drive shaft 16 remains biased to a leftmost position (as illustrated in FIG. 3) in response to the biasing force of spring 28 acting against brake disk 22 and the axially-fixed connection between brake disk 22, roller clutch 24, and drive shaft 16. As should be appreciated, when drive shaft 16 is biased to the leftmost position (as illustrated in FIG. 3), friction surface 64 of brake disk 22 engages friction surface 58 of stationary plate 20, thereby resisting relative rotation of brake disk 22 and stationary plate 20. However, when motor 12 drives drive shaft 16 in direction B, roller clutch 24 is in a free spinning mode such that inner sleeve 62 rotates freely relative to outer sleeve 60 and thus isolates drive shaft 16 from the engaged condition of brake disk 22 and stationary plate 20. Therefore, motor 12 drives drive shaft 16 and sun gear 18 without having to overcome the friction of brake disk 22 and stationary plate 20.

In the second scenario where a drive torque in an opposite direction is used to extend the wire rope, motor 12 is actuated to drive output shaft 34 in direction C (FIG. 2). Output shaft 34 is coupled with cam coupler 14 thereby driving cam coupler 14 in direction C. As a result of the shape of cam 42 and the opposite direction of rotation of cam coupler 14, cam follower 44 travels up cam 42 to an uppermost position along inclined portion 48 of cam 42 within bore 36. Consequently, drive shaft 16 is forced to a rightmost position (as illustrated in FIG. 3) against the biasing force of spring 28. As should be appreciated, when drive shaft 16 is forced to the rightmost position, roller clutch 24 carries brake disk 22 rightward against the biasing force of spring 28, thus disengaging friction surface 64 of clutch plate 24 from friction surface 58 of stationary plate 20. When motor 12 drives drive shaft 16 in direction C, roller clutch 24 is in a locked mode and rotates brake disk 22 as drive shaft 16 rotates. However, clutch plate 22 is disengaged from stationary plate 20 and thus rotates freely without applying any breaking force.

In the third scenario where a driven torque is prevented from extending the wire rope, motor 12 is idle and thus does not output a driving force to output shaft 34. This driven torque, which is applied in direction C, may come in the form of an external force exerted upon the wire rope during a "holding" maneuver. As a result of the biasing force of spring 28, forcing brake disk 22 against stationary plate 20, drive shaft 16 is forced to the leftmost position causing cam follower 44 to travel down cam 42 to the lowermost position within bore 36 (see FIG. 3). This occurs any time drive torque is removed.

As described above, when drive shaft 16 is forced to the leftmost position, friction surface 64 of brake disk 22 engages friction surface 58 of stationary plate 20, thereby preventing relative rotation of brake disk 22 and stationary plate 20. Further, motor 12 is idle and thus the driven torque is attempting to drive drum 102 and consequently drive shaft 16 in direction C. In direction C, roller clutch 24 is in the locked mode and cam follower 44 of drive shaft 16 is in the lowermost (left) position, thereby coupling drum 102, gear train 106, sun gear 18, drive shaft 16, brake disk 22, stationary plate 20. Therefore, the driven torque must overcome the static friction force between brake disk 22 and stationary plate 20 to effect any rotational movement of drum 106. This static friction force is designed to withstand a predetermine maximum load.

Accordingly, the present invention provides a number of advantages over the prior art. Specifically, the present invention provides no drag when the motor produces a drive torque in the power-in direction (direction B). Similarly, the present invention provides very little drag when the motor produces a drive torque in an opposition power-out direction (direction C). Still further, the present invention provides an enormous and reliable frictional resistance to driven torque. This frictional resistance is easily configurable depending upon the characteristics of frictional surfaces 58 and 64 and the spring force of spring 28. The performance of the present invention is further consistent and does not inhibit the operation of the associated device, such as the winch, hoist, or the like. Lastly, the present invention provides a simple and cost effective method of overcoming the disadvantages of the prior art.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A brake mechanism for use in a power device, said brake mechanism comprising:
    a motor outputting a driving torque in a first and a second rotary direction;
    a cam member coupled with an output of said motor for rotation therewith, said cam member having a cam surface;
    a drive member operably coupled with said cam member for rotation therewith, said drive member having a cam follower engaging said cam surface;
    a stationary member fixed against rotation;
    a brake disk for selectively engaging said stationary member to produce a frictional braking force; and
    a one-way clutch operably coupled between said drive member and said brake disk, said one-way clutch being operable in a free spinning mode to permit relative rotation between said drive member and said brake disk and in a locked mode to prevent relative rotation between said drive member and said brake disk.

2. The brake mechanism according to claim 1 wherein said cam follower and said cam surface cooperate to produce an axial movement of said drive member when said motor outputs said driving torque in said second rotary direction.

3. The brake mechanism according to claim 2 wherein said axial movement of said drive member causes said brake disk to reduce friction with said stationary member.

4. The brake mechanism according to claim 1, further comprising:
    a spring member biasing said brake disk into engagement with said stationary member.

5. The brake mechanism according to claim 4, further comprising:
    a thrust washer being disposed between said spring member and said brake disk.

6. The brake mechanism according to claim 5, further comprising a bearing device between said thrust washer and said brake disk.

7. The brake mechanism according to claim 1, further comprising:
    a gear member operably coupled with said drive member for rotation therewith.

8. The brake mechanism according to claim 1 wherein said one-way clutch is in said free spinning mode when said motor outputs said driving torque in said first rotary direction and is in said locked mode when said motor outputs said drive torque in said second rotary direction.

9. The brake mechanism according to claim 1 wherein said one-way clutch is in said locked mode and said brake disk engages said stationary member when said motor is idle.

10. A brake mechanism for use in a power device, said brake mechanism comprising:
    a motor outputting a driving torque in a first and a second rotary direction;
    a cam member coupled with an output of said motor for rotation therewith, said cam member having a cam surface;
    a drive shaft operably coupled with said cam member for rotation therewith, said drive shaft having a cam follower engaging said cam surface operable to position said drive shaft in a first position when said motor is driven in said first rotary direction and a second position when said motor is driven in said second rotary direction;
    a stationary member fixed against rotation;
    a brake disk engaging said stationary member to produce a frictional braking force when said drive shaft is in said first position, said brake disk disengaging said stationary member when said drive shaft is in said second position; and a one-way clutch coupled between said drive shaft and said brake disk, said one-way clutch being operable in a free spinning mode when said motor is driven in said first rotary direction to permit relative rotation between said drive shaft and said brake disk and in a locked mode when said motor is driven in said second rotary direction to prevent relative rotation between said drive shaft and said brake disk.

11. The brake mechanism according to claim 10, further comprising:
a spring member biasing said brake disk into engagement with said stationary member.

12. The brake mechanism according to claim 11, further comprising:
a thrust washer being disposed between said spring member and said brake disk.

13. The brake mechanism according to claim 12, further comprising a bearing device between said thrust washer and said brake disk.

14. The brake mechanism according to claim 10, further comprising:
a gear member operably coupled with said drive shaft for rotation therewith.

15. The brake mechanism according to claim 10 wherein said one-way clutch is in said locked mode and said brake disk engages said stationary member when said motor is idle.

16. A brake mechanism comprising:
a motor having an output shaft outputting a driving torque in a first and a second rotary direction;
a drive shaft;
camming means for coupling said drive shaft and said output shaft for fixed rotation, said camming means operable to position said drive shaft in a first position when said output shaft is driven in said first rotary direction and a second position when said output shaft is driven in said second rotary direction;
braking means for producing a frictional braking force when said drive shaft is in said first position and for permitting free rotation when said drive shaft is in said second position; and
a one-way clutch coupled between said drive shaft and said braking means, said one-way clutch being operable in a free spinning mode when said output shaft is driven in said first rotary direction to permit relative rotation between said drive shaft and said braking means and in a locked mode when said output shaft is driven in said second rotary direction to prevent relative rotation between said drive shaft and said braking means.

17. A brake mechanism comprising:
a motor having an output shaft outputting a driving torque in a first and a second rotary direction;
a drive shaft;
a camming device operably coupling said drive shaft and said output shaft for fixed rotation, said camming device operable to position said drive shaft in a first position when said output shaft is driven in said first rotary direction and a second position when said output shaft is driven in said second rotary direction;
a brake device operably producing a frictional braking force when said drive shaft is in said first position and permitting free rotation when said drive shaft is in said second position; and
a one-way clutch coupled between said drive shaft and said brake device, said one-way clutch being operable in a free spinning mode when said output shaft is driven in said first rotary direction to permit relative rotation between said drive shaft and said brake device and in a locked mode when said output shaft is driven in said second rotary direction to prevent relative rotation between said drive shaft and said brake device.

18. The brake mechanism according to claim 17 wherein said braking device comprises:
a stationary member fixed against rotation;
a brake disk engaging said stationary member to produce a frictional braking force when said drive shaft is in said first position, said brake disk disengaging said stationary member when said drive shaft is in said second position; and
a spring member biasing said brake disk into engagement with said stationary member.

19. The brake mechanism according to claim 18, further comprising:
a thrust washer being disposed between said spring member and said brake disk.

20. The brake mechanism according to claim 19, further comprising a bearing device between said thrust washer and said brake disk.

21. The brake mechanism according to claim 17 wherein said camming device comprises:
a cam member coupled with said output shaft of said motor for rotation therewith, said cam member having a cam surface; and
a cam follower coupled with said drive shaft, said cam follower engaging said cam surface.

22. The brake mechanism of claim 1, wherein the stationary member is fixed to a housing.

23. The brake mechanism of claim 10, wherein the stationary member is fixed to a housing.

24. The brake mechanism of claim 16, further comprising a stationary member fixed to a housing, said braking means selectively engaging said stationary member to produce a frictional braking force.

25. The brake mechanism of claim 17, further comprising a stationary member fixed to a housing, said brake device selectively engaging said stationary member to produce a frictional braking force.

* * * * *